(12) United States Patent
Langton

(10) Patent No.: US 6,772,239 B2
(45) Date of Patent: Aug. 3, 2004

(54) COMPUTER PRODUCT AND METHOD FOR SMART CARD

(75) Inventor: Philip Sydney Langton, Santa Cruz, CA (US)

(73) Assignee: Swapcard.com Inc., Santa Cruz, CA (US)

( * ) Notice: Subject to any disclaimer, the term of this patent is extended or adjusted under 35 U.S.C. 154(b) by 106 days.

(21) Appl. No.: 09/862,787

(22) Filed: May 19, 2001

(65) Prior Publication Data

US 2002/0035651 A1 Mar. 21, 2002

Related U.S. Application Data

(63) Continuation of application No. 09/551,735, filed on Apr. 18, 2000, now Pat. No. 6,553,481.

(51) Int. Cl.$^7$ .............................................. G06F 13/14
(52) U.S. Cl. ........................ 710/31; 709/105; 709/223; 235/111; 235/379; 235/380
(58) Field of Search ........................ 710/31; 709/223; 235/379, 380

(56) References Cited

U.S. PATENT DOCUMENTS

| | | | | |
|---|---|---|---|---|
| 5,737,534 A | * | 4/1998 | Suzuki | 395/200.53 |
| 5,884,077 A | * | 3/1999 | Suzuki | 395/675 |
| 6,196,459 B1 | * | 3/2001 | Goman et al. | 235/380 |
| 6,394,343 B1 | * | 5/2002 | Berg et al. | 235/379 |

* cited by examiner

Primary Examiner—A. Elamin
(74) Attorney, Agent, or Firm—H. Black P.E.

(57) ABSTRACT

A system, method and computer program for smart card with memory is disclosed. A very low cost approach to embodiment is disclosed, making use of a micro-controller with a FLASH memory or a WORM memory. An approach to programming a flash memory under the control of instructions within that memory itself is disclosed.

In utilizing the invention, it is possible to build smart cards at a lower cost than heretofore.

7 Claims, 6 Drawing Sheets

COMPUTER PRODUCT AND METHOD FOR SMART CARD

RELATED APPLICATIONS

This application is a Continuation In Part of application Ser. No. 09/551,735, entitled "SYSTEM AND METHOD FOR SMART CARD WITH MEMORY", filed Apr. 18, 2000 now U.S. Pat. No. 6,553,481, inventor Philip Sydney Langton, which application is incorporated herein in its entirety by this reference.

FIELD OF THE INVENTION

The present invention relates generally to handheld computers and smart cards. In particular the invention relates to low cost, low-power computerized cards with writeable memory.

BACKGROUND OF THE INVENTION

A computerized smart card is typically a cuboid enclosure with dimensions on the order of 100 mm×40 mm×5 mm of a resilient plastic material that includes a semiconductor chip capable of holding data and typically capable of supporting multiple user applications.

Physically, a smart card often resembles the commonplace credit card but having one or more semiconductor devices attached to a module embedded in the card, providing communication with the outside world typically, though not necessarily, via electrical contacts.

Though usage is commonplace, handheld computers and smart cards have been too expensive for ubiquitous use. A number of problems exist in reducing the cost of these to a minimum. Moreover, smart cards that implement any form of wireless (radio, optical, audio etc.) communication tend to be expensive and include some form of computer—typically a micro-controller. Low cost micro-controllers are well known in the art. Unlike smart cards with electrical contacts, wireless smart cards also require a self-contained energy source (typically an electro-chemical cell or battery of cells) which further limits design and drives up cost.

A bare minimum useful wireless handheld computer (or smart card) will comprise an enclosure, an electrical energy source, a programmable microprocessor or micro-controller of some form, together with memory, operator controls, a wireless means for data input and a wireless means for data output. When a bare-bones handheld computer is designed for lowest possible cost, consistent with at least a minimum of usefulness, it becomes apparent that the need for a microprocessor or micro-controller together with memory constitute a significant proportion of the total cost. Therefore it is desirable to use the cheapest possible micro-controller part (with on-board memory), consistent with energy constraints.

A minimally useful handheld computer will require three classes of memory:

1. A non-volatile, readable memory for storage of program codes and unchanging data. This memory may be, but need not be, a read-only memory (ROM).
2. A non-volatile, read/write memory for storage of data. This memory does not need to be fast, nor does it need to support many writes cycles.
3. A read/write scratch pad memory with an effectively unlimited life cycle.

Various memory technologies are available, and indeed a battery backed complementary metal oxide semiconductor (CMOS) memory might meet the requirements of all three memory classes supra. However lower cost approaches are possible and such a "battery-CMOS" device would need to be continuously energized.

Generally scratch pad memory is included with all micro-controllers, so it is not a crucial design constraint in the present context.

Certain very low cost micro-controllers with on-board non-volatile memory at the present time provide a FLASH memory with a bulk erase feature. FLASH memories with bulk erase are well known in the art. For lowest possible cost it is desirable to use a single FLASH memory for both program codes and data. The cheapest micro-controllers with on-board FLASH memory are not primarily intended for use in such a mode. Rather the intention is that the FLASH memory shall be programmed using an external computer or programming machine of some kind and the memory shall be bulk erased with the same or a similar device. Such FLASH memory is intended to be used in a manner whereby it is erased all at once (in bulk) and then re-programmed in entirety.

Thus, a need exists for an extremely low cost smart card. Also, a need exists for a method of implementing a computer system with persistent data storage implemented as a single FLASH memory.

THE SUMMARY OF THE INVENTION

Accordingly a method is disclosed for implementing a computer system with persistent data storage using a single non-volatile FLASH memory. A SwapCard (a trademark of SWAPCARD Inc.) based upon an ATMEL (™) AT89LV51 embedded micro-controller is disclosed. The AT89LV51 is a complementary metal-oxide semiconductor (CMOS) device, CMOS devices being common in the art. This micro-controller includes many features of the '8051' like micro-controller family members of which are well known in the art. A particular version of this micro-controller includes 128 bytes of scratch pad memory and a single FLASH memory of (typically) 32 Kbits. A part of the FLASH memory is used to hold program instructions and is written using an external programming computer in the factory when the SwapCard is manufactured. A second part of the FLASH memory is used to hold data and is read from and written to under the control of the program instructions in the first part (i.e. the low address space) of the FLASH memory.

External to the micro-controller but within the Swapcard, programming circuitry is provided for programming an eight-bit byte into the second part of the FLASH memory. A significant constraint is that it is not possible for the micro-controller to fetch program instructions from the FLASH memory while a byte is being programmed. In fact, programming a byte of FLASH memory takes a much longer time (on the order of a millisecond) than the typical instruction cycle time for the micro-controller. The micro-controller must be held in a reset state during programming, causing the ordinary program execution sequence to be inhibited.

Whenever programming of a byte to FLASH memory is completed the SwapCard (™) circuitry external to the micro-controller releases the micro-controller RESET control wire and the firmware must recover its context. For cost reasons, no non-volatile memory is made available to store the context across data programming cycles. Thus, the firmware must recover its context by using a resource external to the SwapCard. One external source disclosed is a co-operating computer with which the SwapCard is in wireless communication.

DETAILED DESCRIPTION OF A PREFERRED EMBODIMENT

Figure 1:
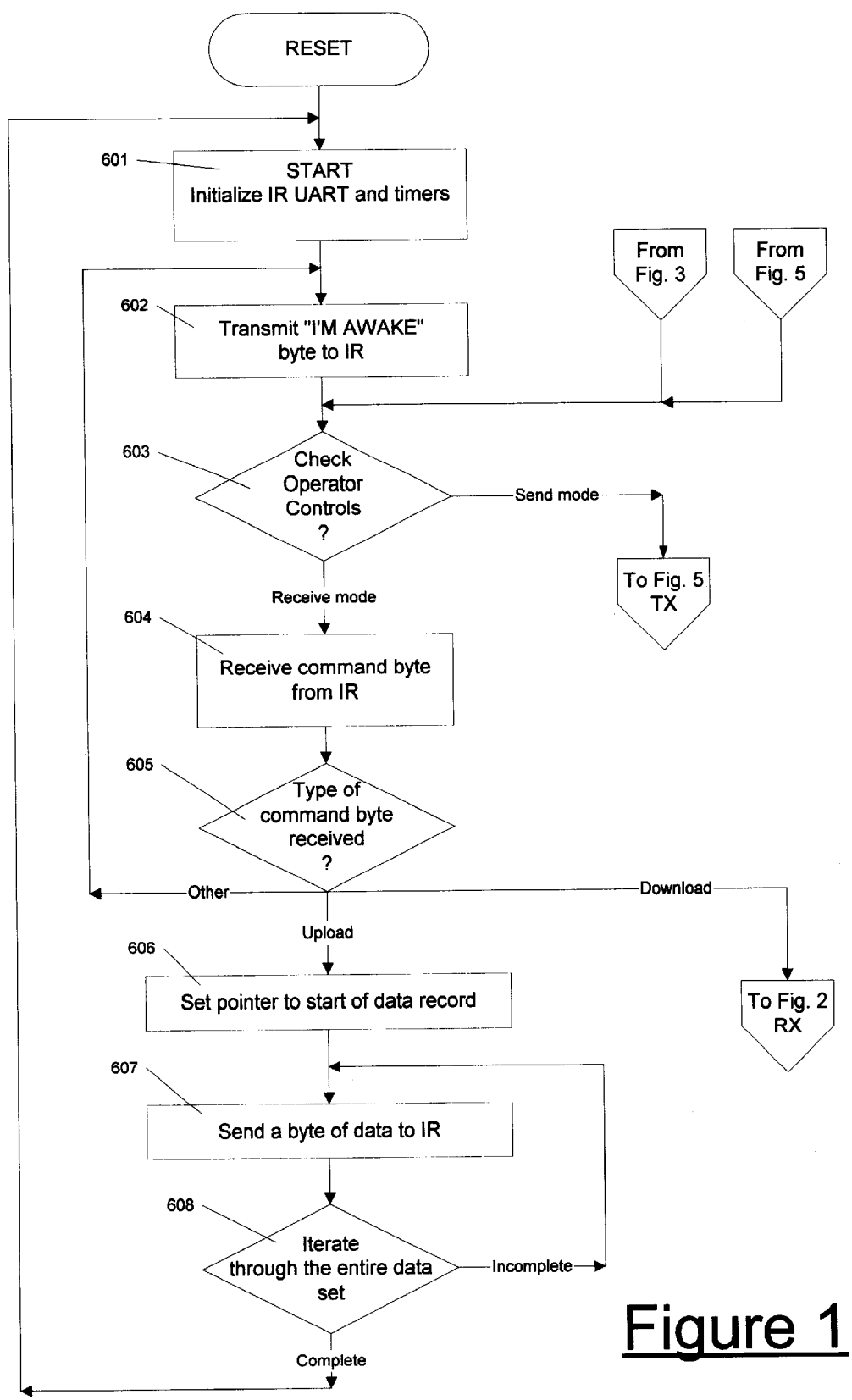
FIG. 1 is a block diagram of the processing that occurs due to the SwapCard (™) RESET event.

The following description is presented to enable a person of ordinary skill in the art to make and to use the invention and is provided in the context of a patent application and its requirements. Various modifications to the embodiment disclosed will be readily apparent to those skilled in the art and the general principles herein may be applied to other embodiments. Thus, a present invention includes, but is not intended to be limited to the embodiment shown. It is to be accorded the widest scope consistent with the principles and features described herein.

For, inter alia, reasons of economy it is desired to provide only a single memory array and a low cost non-volatile memory capable of both read and write operations in FLASH memory. FLASH memories are well known in the art. A design constraint is that though it is possible to write to the FLASH memory on a byte by byte basis, it is not possible to erase FLASH memory on a byte by byte basis—the whole FLASH memory space (program AND data) may be erased only during a bulk erase operation whereby the entire FLASH memory becomes erased. Thus writing a byte of data ("a programming cycle") consists of clearing certain (or all) bits within a single byte of FLASH memory, whereas an erase cycle consists of setting all bits of all bytes of the FLASH memory. The device has no capability for setting a selected subset of bits. It can be seen therefore that without the use of external circuitry and without erasing the firmware itself it is not usefully possible to perform an erase operation under the control of firmware resident in the FLASH memory.

Consequently when storing run-time data to the FLASH memory of the SwapCard the FLASH memory is managed as though it were a Write-Once Read-Many (WORM) memory. Techniques for managing the organization of data files within WORM memories are well-known in the relevant art.

An implementation requirement imposed by the design of the micro-controller is that the micro-controller must be held in a reset (signal on RESET wire asserted) while a byte of FLASH memory is written (programming cycle).

Thus it is desired that the micro-controller firmware manage the writing of data bytes to the FLASH memory itself—and this is not an ordinary mode of operation for the micro-controller as will be discussed in the description of FIG. 5 herein. Therefore, the micro-controller must reinitialize itself from the reset state after each byte of data is to FLASH memory.

As can be seen, a significant constraint is that it is impractical to use non-volatile memory within the SwapCard to retain state information across reset operations since only one byte is written to non-volatile FLASH memory per reset in low cost embodiments. A solution is for the microprocessor to recover its state information using external resources, however incorporating such resources external to the micro-controller within the SwapCard itself works against the efforts to keep manufacturing cost very low. A disclosed approach is by way of having a host computer retain and provide state information on behalf of the SwapCard.

In summary, whenever programming of a byte to FLASH memory is completed the SwapCard (™) circuitry external to the micro-controller releases the micro-controller RESET control wire and the firmware must recover its context. For cost reasons, no non-volatile memory is made available to store the context across data programming cycles. Thus, the firmware must recover its context by using a resource external to the SwapCard. One external source disclosed is a co-operating computer with which the SwapCard is in wireless communication. The co-operating computer may be, but need not be, another SwapCard. This invention provides a method for maintaining context information and is further described below with the aid of the drawings.

FIG. 1 shows the processing that results from the SwapCard (™) RESET event. A microcontroller RESET event may be caused as part of the power up sequence when an operator control becomes activated, or, alternatively a RESET event occurs at the completion of programming (writing) a byte of data to the WORM memory. In box 601, the START results by initializing the IR UART (Infra Red transducer Universal Asynchronous Receiver Transmitter) and some timers. IR transducers coupled to UARTs are well known in the relevant arts. In box 602, the SwapCard (™) transmits an "I'M AWAKE" message byte via the IR transducer, which communicates the command to an external computer. In box 603, the operator controls are checked. If the operator control indicates SEND mode, then we proceed to FIG. 5. If the operator control indicates RECEIVE mode, then we proceed to box 604 where the receive command byte is received from an IR transducer. In box 605, the received command is analyzed to determine what type of command it is. If it is the DOWNLOAD type, we proceed to FIG. 2. If it is the UPLOAD type, we proceed to box 606. If it is any other type, we proceed back to box 602. In box 606, a pointer is set to the start of a data record. In box 607, a byte of data is sent to an IR transducer and box 608 controls an iteration through an entire data set (or subset) until completion. Upon completion, control is transferred back to box 601.

Figure 2:
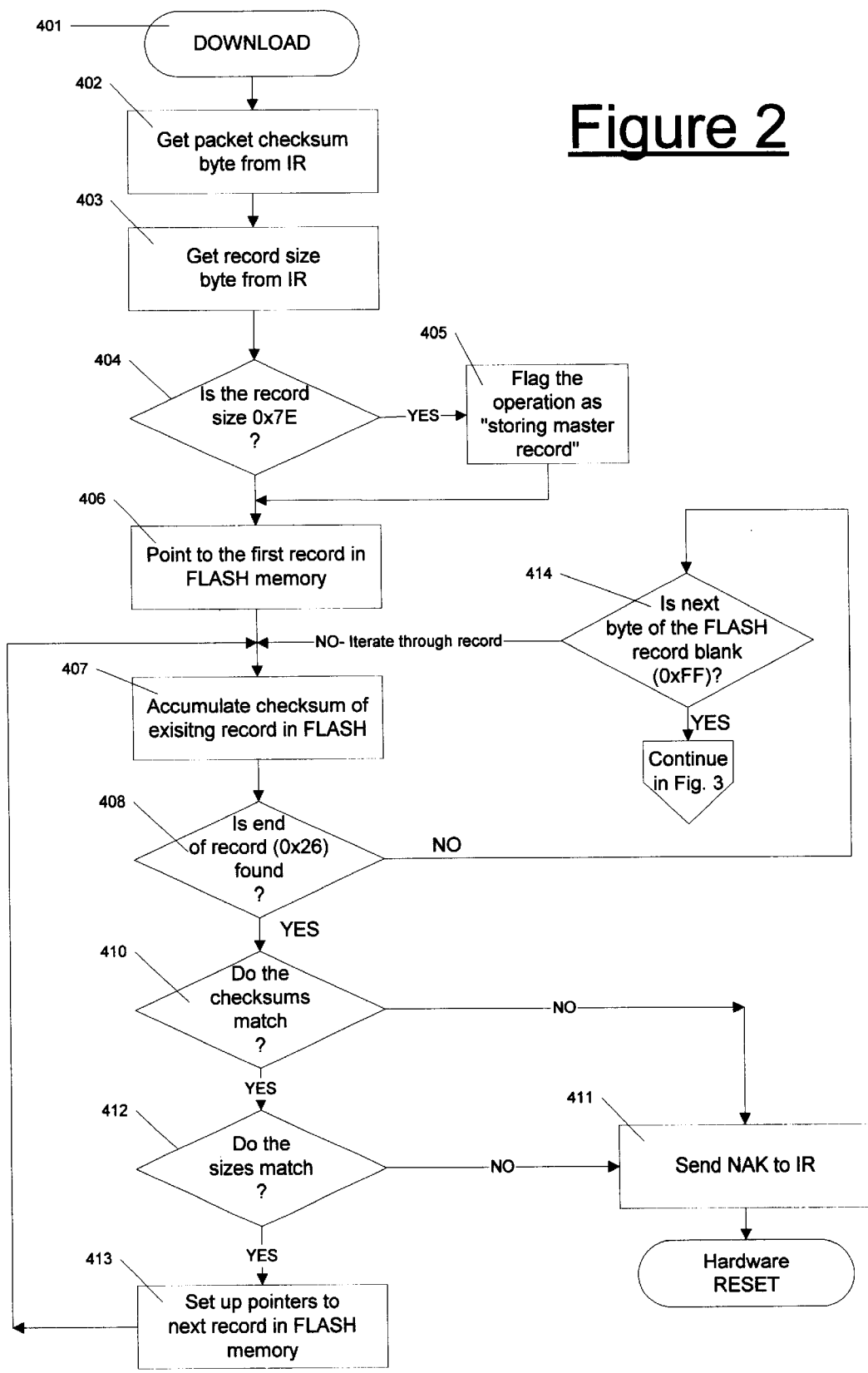
FIG. 2 is a block diagram of the processing that occurs due to the SwapCard (™) DOWNLOAD command.

FIG. 2 shows the processing that results from the SwapCard (™) DOWNLOAD command. The packet's checksum byte (in box 402) and the record size byte (in box 403) are received from the IR. In box 404, the record size is checked and if it is 0x7E, the operation is flagged as "storing master record" in box 405. Otherwise, in box 406, a pointer is set to the first record in FLASH memory. In box 407, the checksum of this record is accumulated in FLASH. The end of record, indicated by 0x26, is checked for in box 408. If the end of record is not found in box 408, then it proceeds to box 414 where the next byte in FLASH is compared to blank (0xXFF) and we continue to FIG. 3. If the end of record is found in box 408, the checksums are compared in box 410. If there is a match, the record sizes are compared in box 412, If the sizes match, pointers to the next record in FLASH memory are set up in box 413 and control passes back to box 407. Going back to boxes 410 and 412, if the checksums do not match or the record sizes don't match a NAK is sent to the IR (box 411) and the hardware is RESET.

Figure 3:
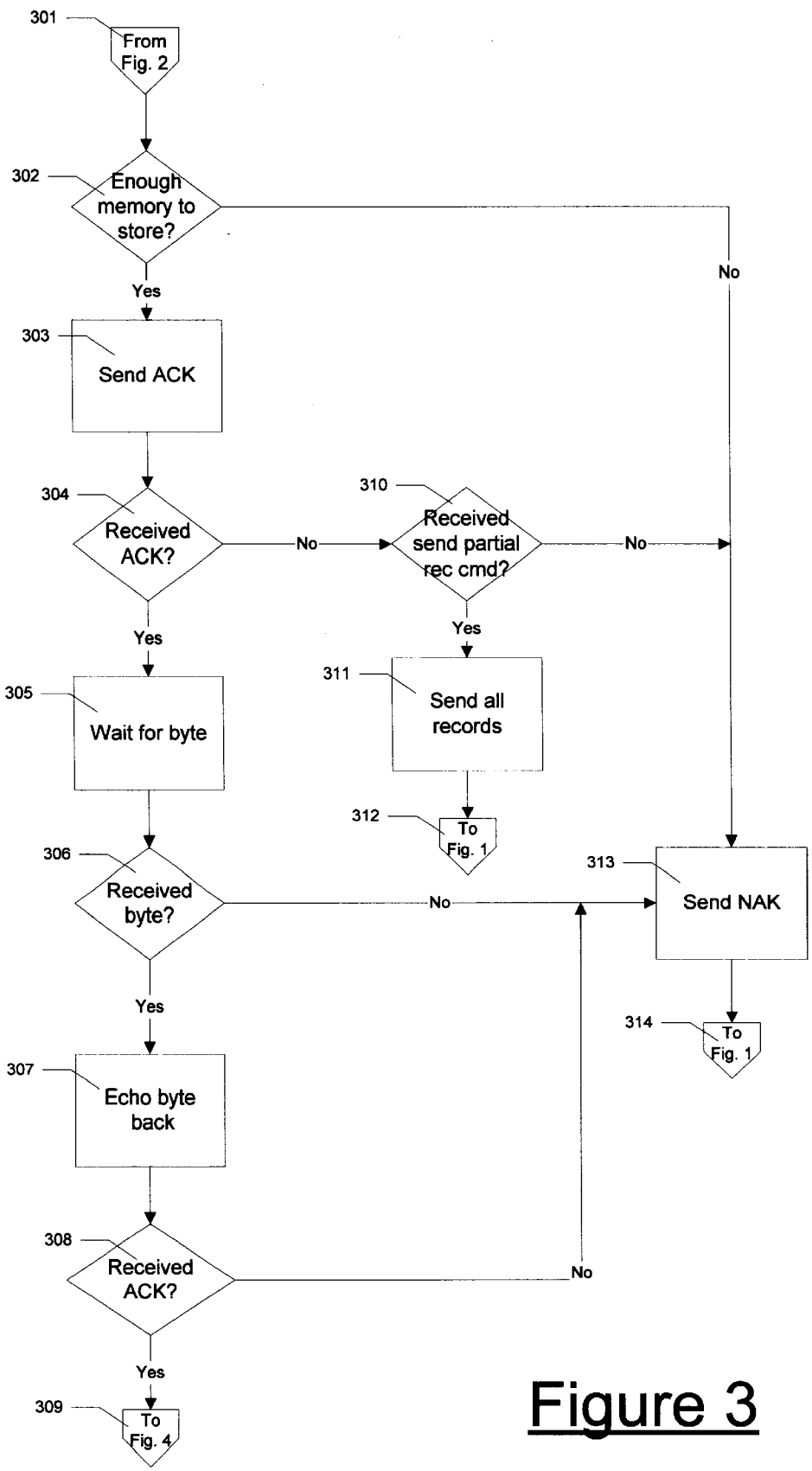
FIG. 3 is a diagram that continues from FIG. 2.

FIG. 3 is a continuation of the Download diagram which started in FIG. 2, control passes from box 414 (FIG. 2) to box 301 in FIG. 3. In box 302, it checks to determine if there is enough memory to store the next received byte. If there is enough memory, an ACK (box 303) is sent to the microcontroller which initiated the Download to let it know there is sufficient memory. If the other micro-controller responds with an ACK (decision box 304), this smartcard will wait for a byte of data to be sent in box 305. In box 306, if the byte of data is received this same byte of data is echoed back in box 307. In box 308, if the smartcard receives an ACK then it knows that the other microcontroller successfully received the echoed byte and it will proceed to FIG. 4.

If a message was received from the other micro-controller but it wasn't an ACK, then the smartcard will proceed to determine if it received a "send partial record command" instead (box 310). If a send partial record command was received, then it will send all records to the other microcontroller (box 311) and then it will proceed to box 603 in FIG. 1. If the received message was neither an ACK (box 304) nor a "send partial record command" (box 308) then a NAK will be sent (box 313) and it will proceed to box 603 in FIG. 1.

If there isn't enough memory to store the byte in box 302, or if the "send partial record command" wasn't received in box 310 and the smart card didn't receive an ACK in box 308, then a NAK will be sent in box 313 and it will continue back to box 603 in FIG. 1.

Figure 4:
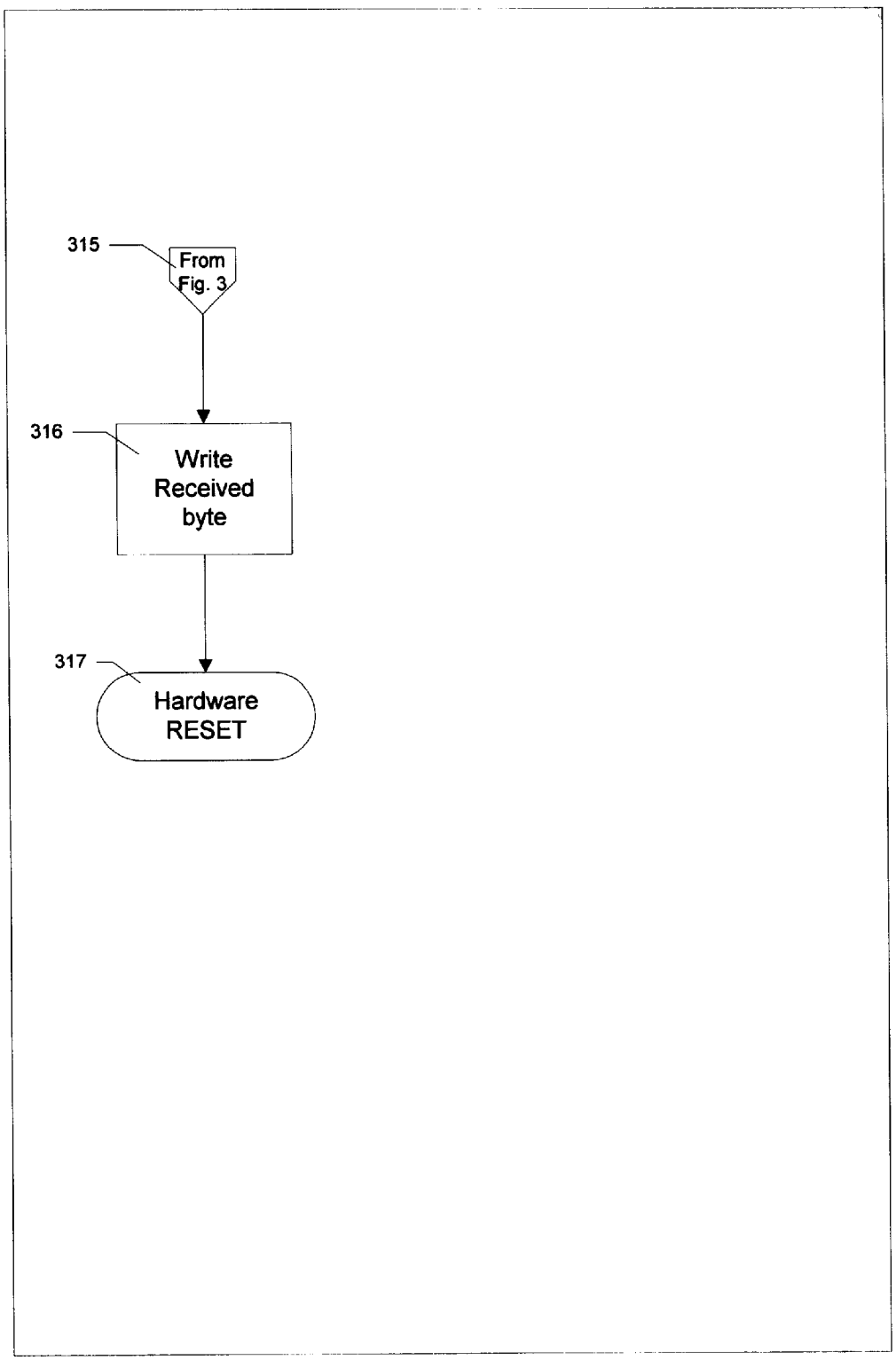
FIG. 4 is a diagram that continues from FIG. 3.

Referring to FIG. 4, the logic continues on (box 315) from FIG. 3 box 309. In box 316, the received byte is written or "programmed" to memory. Then in box 317, a hardware reset is performed. Then it comes into RESET and sends "I'm Awake" at the top of FIG. 1. The other micro-controller will send the necessary information to enable the smartcard to recover its state and proceed with writing the next received byte of data.

Figure 5:
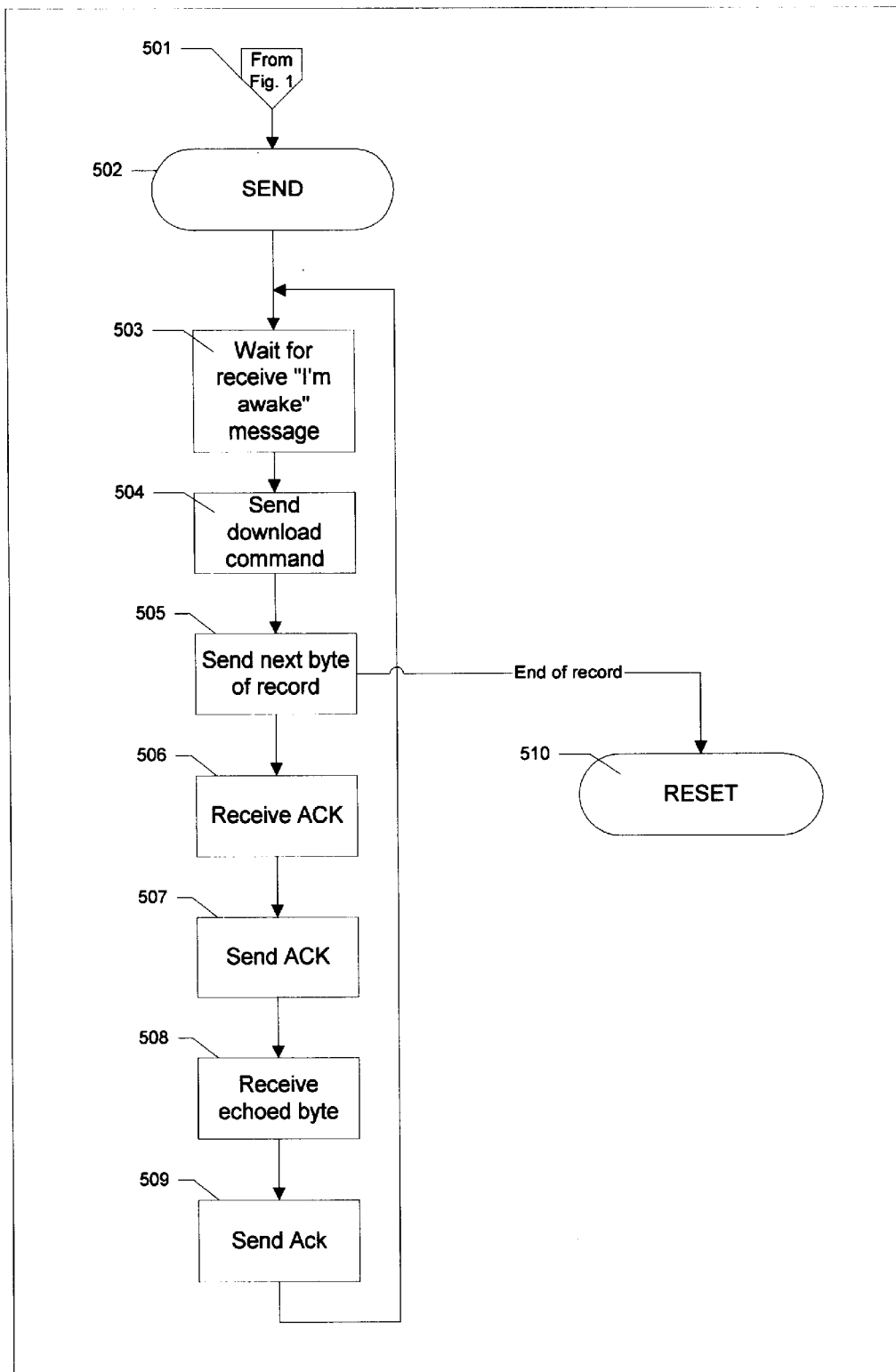
FIG. 5 shows diagrammatically the processing of the "SEND" command.
Figure 6:
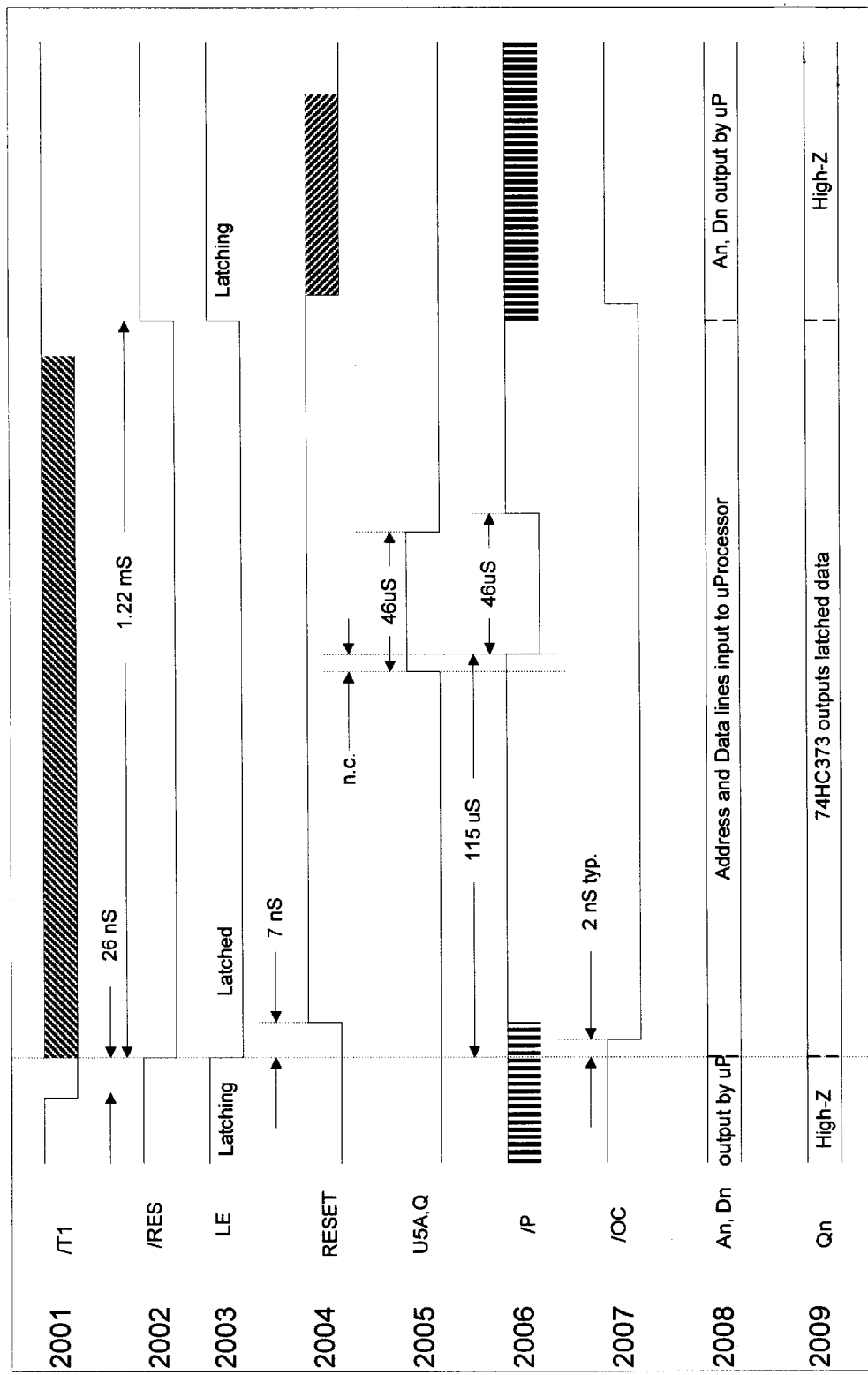
FIG. 6 is a timing diagram for a memory write cycle including the reset state.

Referring now to FIG. 5, this shows diagrammatically the processing of the "SEND" command. This is best understood as "the other side of the link" i.e. what the co-operating computer does to support the processing already described. Entry is made at box 501 for the SEND command (box 502). The smartcard implementing this transfer is communicating with another smartcard which is to receive and program data. As will be appreciate by one of ordinary skill in the art, the processing described infra for FIG. 6 is also applicable to a non-smartcard computer which is supporting download to a smartcard. In box 503 there is a wait for reception of an "I'M AWAKE" command that was sent by a smartcard. Next a download command (a byte of special well known non-textual value—the actual value is not critical to the invention) is sent to the other smartcard. Then a byte of data is sent (box 505), if the transfer is completed then the smartcard resets (box 510). A non-smartcard computer implementing the algorithm might more typically return control to an operating system rather than resetting, but that is a non-critical implementation detail. Then an ACK is received from the remote smartcard (box 506), and an ACK is sent in response (box 507). Next an echo of the byte of data that was previously sent (in box 505) is received (box 508). A further ACK is sent (box 509) to confirm successful receipt of the echoed data and finally control returns to box 503 so that the entire set of data to be programmed is iterated through a byte at a time. The remote computer programs each byte of data as received, resets itself as part of the programming cycle and then emits a new "I'M AWAKE" message to stimulate sending of the next byte of data.

Referring to FIG. 6, a timing diagram for the FLASH memory write cycle implemented in a SwapCard is shown. The active low signal /T1 (2001) initiates the write cycle by being asserted for at least 26 nanoseconds, /T1 is released at a convenient and much later time. /T1 is implemented as a output port circuit of the microcontroller and becomes asserted under firmware instruction control. Active low signal /RES (2002) is asserted throughout the FLASH write cycle, a period of at least 1.22 milliseconds, this lengthy period provides, inter alia, an opportunity for the microcontroller chip to regain thermal equilibrium that may have been subject to local disturbances due to the programming physics. The active high signal LE (2003, latch enable) is derived from /RES and causes address and data bits (An, Dn, 2008) output by the microcontroller to be latched into external circuitry (not shown). In the present implementation there are exactly eight data bits (DO.D7) that are externally latched for programming. At least 7 nanoseconds later the active high RESET signal (2004) is asserted at the microcontroller, this 7 nanosecond margin provides more than sufficient time for the data to be latched into the external circuitry. A similar 2 nanoseconds (typical) delay prior to the falling edge of the /OC control (2007) applies. Still referring to FIG. 5, the active low assertion of /OC (2007) causes the output lines (Qn, 2009) of the external circuitry to transition from tri-state (hi-Z, high impedance) to output of the previously latched data—thus permitting input of address and data values to the microcontroller during programming. Lines U5A,Q (2005) and /P (2006) control the actual writing of data into the FLASH memory in accordance with microcontroller design specifications. The it can be seen that in the present context, memory write cycle involves and "reset state" and the reset state inhibits execution of firmware instructions for an extended period of many typical instruction times during the actual writing of a byte of data to the FLASH memory in the microcontroller.

The disclosures are intended to be illustrative rather than limiting and the invention should be accorded the broadest scope consistent herewith.

What is claimed is:

1. A method for maintaining context information in a first computer comprising the acts of:

a) executing a first plurality of instructions in the first computer for establishing a context of the first computer in response to a first set of control commands received from a second computer;

b) initiating a memory write cycle of the first computer, the memory write cycle comprising a creation of a reset state within the first computer;

c) executing a second plurality of instructions in the first computer in response to the reset state wherein the plurality of instructions causes the first computer to transmit a message to the second computer;

d) receiving, by the first computer, a second set of control commands from the second computer;

e) executing a third plurality of instructions in the first computer to re-establish the context of the first computer based upon the second set of control commands.

2. The method of claim 1 wherein:

the first computer is a smart card.

3. The method of claim 1 wherein:

first computer operates from a power source consisting essentially of an electro-chemical cell, the power source comprised entirely within the first computer.

4. The method of claim 1 wherein:

the first computer comprises a memory array wherein:

the memory array comprises the first plurality of instructions and the memory write cycle is directed to the memory array.

5. The method of claim 4 wherein:

the memory array is a WORM memory.

6. The method of claim 4 wherein:

the memory array is a FLASH memory.

7. An article of manufacture comprising:

A computer readable medium having computer readable program code embodied thereon for causing at least one computer to perform the acts of,
   a) executing a first plurality of instructions in the first computer for establishing a context of the first computer in response to a first set of control commands received from a second computer;
   b) initiating a memory write cycle of the first computer, the memory write cycle comprising a creation of a reset state within the first computer;
   c) executing a second plurality of instructions in the first computer in response to the reset state wherein the plurality of instructions causes the first computer to transmit a message to the second computer;
   d) receiving, by the first computer, a second set of control commands from the second computer;
   e) executing a third plurality of instructions in the first computer to re-establish the context of the first computer based upon the second set of control commands.

* * * * *